United States Patent
Cruz Mota et al.

(10) Patent No.: US 9,286,473 B2
(45) Date of Patent: Mar. 15, 2016

(54) QUARANTINE-BASED MITIGATION OF EFFECTS OF A LOCAL DOS ATTACK

(71) Applicant: Cisco Technology, Inc., San Jose, CA (US)

(72) Inventors: Javier Cruz Mota, Assens (CH); Jean-Philippe Vasseur, Saint Martin d'Uriage (FR); Andrea Di Pietro, Lausanne (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 14/165,439

(22) Filed: Jan. 27, 2014

(65) Prior Publication Data

US 2015/0186642 A1 Jul. 2, 2015

Related U.S. Application Data

(60) Provisional application No. 61/922,568, filed on Dec. 31, 2013.

(51) Int. Cl.
*G06F 21/55* (2013.01)
*H04W 12/12* (2009.01)

(52) U.S. Cl.
CPC ............. *G06F 21/554* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 7,137,145 B2 | 11/2006 | Gleichauf | |
| 7,483,972 B2 | 1/2009 | Bhattacharya et al. | |
| 7,526,806 B2 | 4/2009 | Wiley et al. | |
| 7,607,041 B2 | 10/2009 | Kraemer et al. | |
| 7,653,941 B2 | 1/2010 | Gleichauf | |
| 7,779,471 B2 | 8/2010 | Balasubramaniyan et al. | |
| 8,230,498 B2 | 7/2012 | Shaffer et al. | |
| 8,261,355 B2 | 9/2012 | Rayes et al. | |
| 8,488,488 B1 | 7/2013 | Hermanns et al. | |
| 2010/0050235 A1* | 2/2010 | Hardie et al. | 726/3 |
| 2011/0205969 A1* | 8/2011 | Ahmad et al. | 370/328 |
| 2012/0144038 A1 | 6/2012 | Hildebrand | |
| 2012/0155511 A1 | 6/2012 | Shaffer et al. | |
| 2012/0210422 A1 | 8/2012 | Friedrichs et al. | |
| 2012/0307624 A1* | 12/2012 | Vasseur et al. | 370/221 |

(Continued)

OTHER PUBLICATIONS

Vasseur, et al., "Computer Network Attack Mitigation", U.S. Appl. No. 61/922,568, filed Dec. 31, 2013, 58 pages, U.S. Patent and Trademark Office, Alexandria, VA.

(Continued)

*Primary Examiner* — David Le
(74) *Attorney, Agent, or Firm* — Parker Ibrahim & Berg LLC; James M. Behmke; Stephen D. LeBarron

(57) ABSTRACT

In one embodiment, techniques are shown and described relating to quarantine-based mitigation of effects of a local DoS attack. A management device may receive data indicating that one or more nodes in a shared-media communication network are under attack by an attacking node. The management device may then communicate a quarantine request packet to the one or more nodes under attack, the quarantine request packet providing instructions to the one or more nodes under attack to alter their frequency hopping schedule without allowing the attacking node to learn of the altered frequency hopping schedule.

20 Claims, 17 Drawing Sheets

(56) References Cited

U.S. PATENT DOCUMENTS

2013/0139261 A1     5/2013    Friedrichs et al.
2013/0305362 A1    11/2013   Hermanns et al.

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Wood, et al., "JAM: A Jammed-Area Mapping Service for Sensor Networks", 24th IEEE Real-Time Systems Symposium (RTSS 2003), Dec. 2003, pp. 286-297, Institute of Electrical and Electronics Engineers.

Wood, et al., "DEEJAM: Defeating Energy-Efficient Jamming in IEEE 802.15.4-Based Wireless Networks", 4th Annual IEEE Communications Society Conference on Sensor, Mesh and Ad Hoc Communications and Networks (SECON '07), Jun. 2007, pp. 60-69, Institute of Electrical and Electronics Engineers.

Xu, et al., "Jamming Sensor Networks: Attack and Defense Strategies", IEEE Network, vol. 20, Issue 3, May-Jun. 2006, pp. 41-47, Institute of Electrical and Electronics Engineers.

European Search Report dated Mar. 27, 2015 issued in connection with EP 14 19 7785.

European Search Opinion dated Mar. 27, 2015 issued in connection with EP 14 19 7785.

Wei Yang, et al., "Stability Analysis of P2P Worm Propagation Model with Dynamic Quarantine Defense," Journal of Networks, vol. 6, No. 1, Jan. 2011, pp. 153-162.

Incheol Shin, et al., "AHSWN__177 p. 1 A Novel Approach Against Reactive Jamming Attacks," Ad Hoc & Sensor Wireless Networks, Jan. 1, 2010, pp. 1-25.

\* cited by examiner

QUARANTINE-BASED MITIGATION OF EFFECTS OF A LOCAL DOS ATTACK

RELATED APPLICATIONS

This application claims priority to U.S. Provisional Application No. 61/922,568, filed Dec. 31, 2013, entitled: COMPUTER NETWORK ATTACK MITIGATION, by Vasseur et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
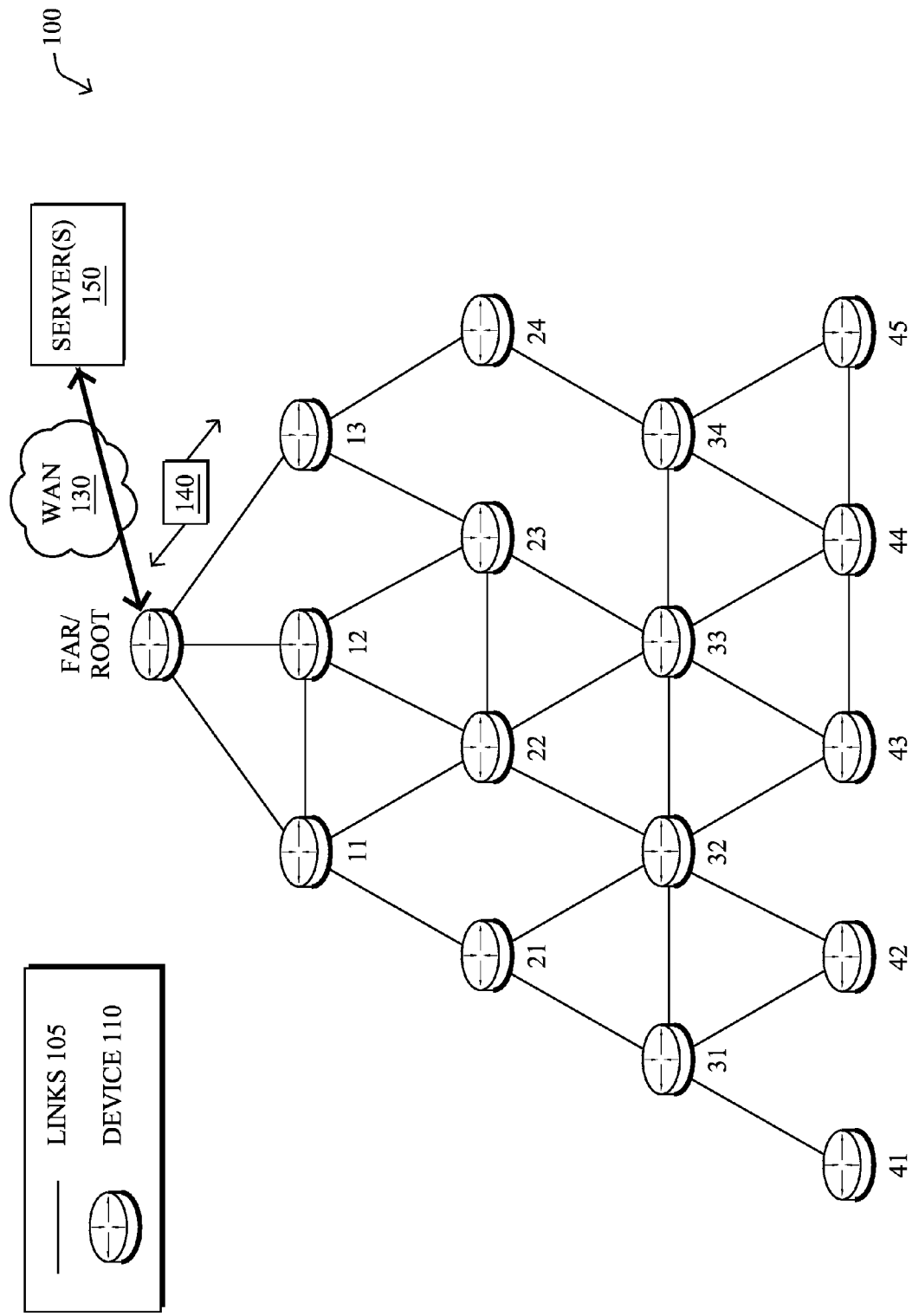
FIG. 1 illustrates an example communication network.

According to one or more embodiments of the disclosure, techniques are shown and described relating to quarantine-based mitigation of effects of a local DoS attack. A management device may receive data indicating that one or more nodes in a shared-media communication network are under attack by an attacking node. The management device may then communicate a quarantine request packet to the one or more nodes under attack, the quarantine request packet providing instructions to the one or more nodes under attack to alter their frequency hopping schedule without allowing the attacking node to learn of the altered frequency hopping schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
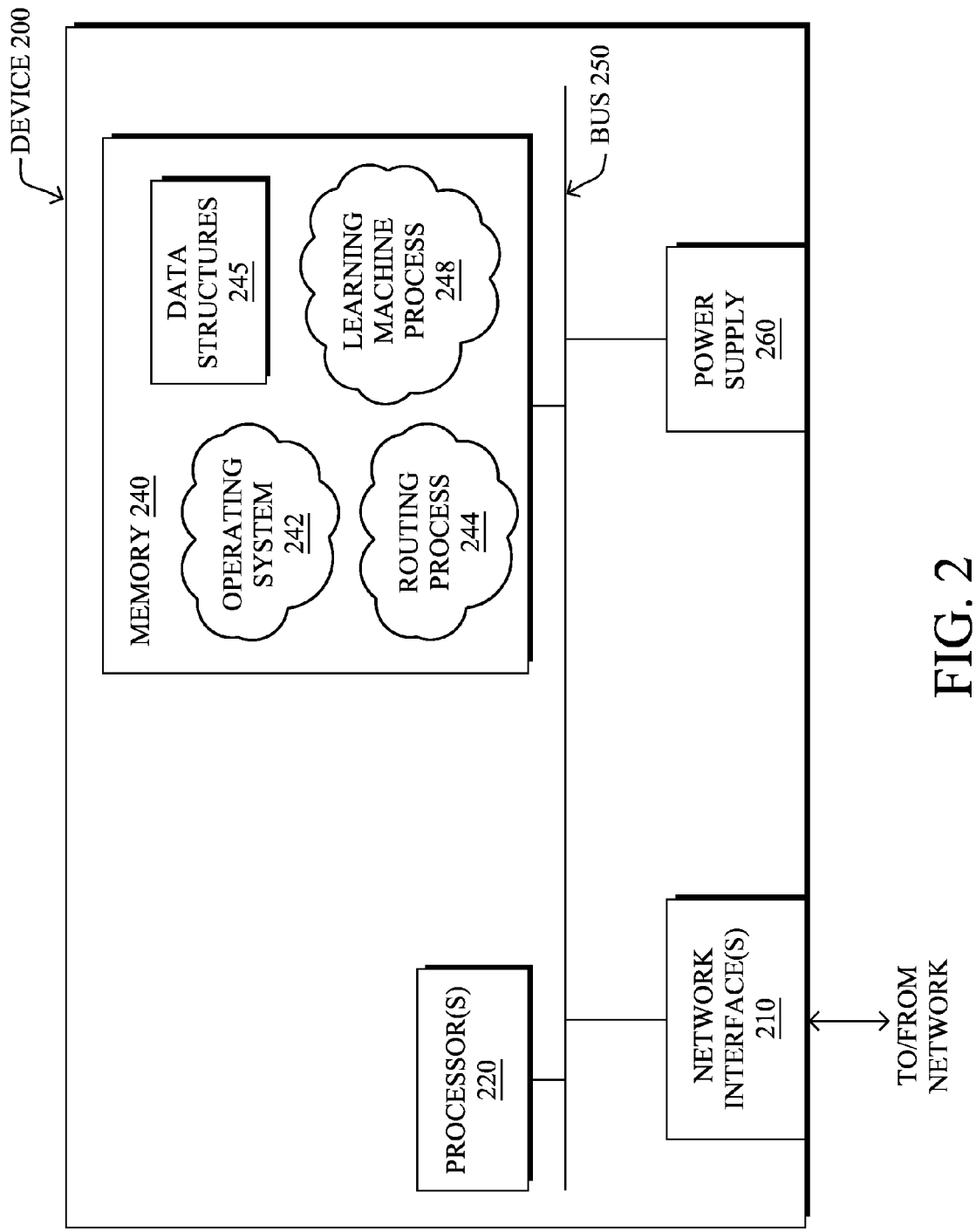
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
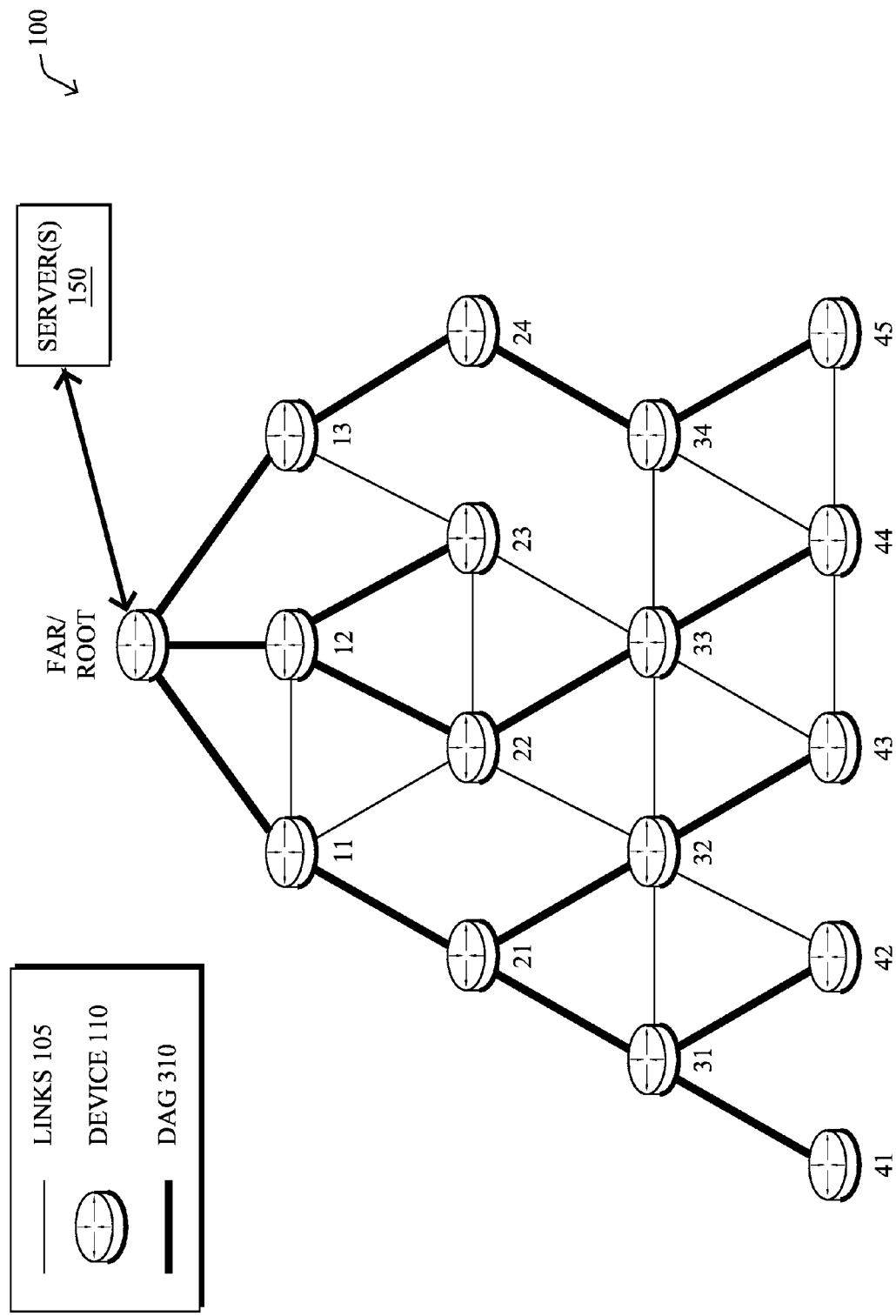
FIG. 3 illustrates an example directed acyclic graph (DAG) in the communication network of FIG. 1.
Figure 4A:
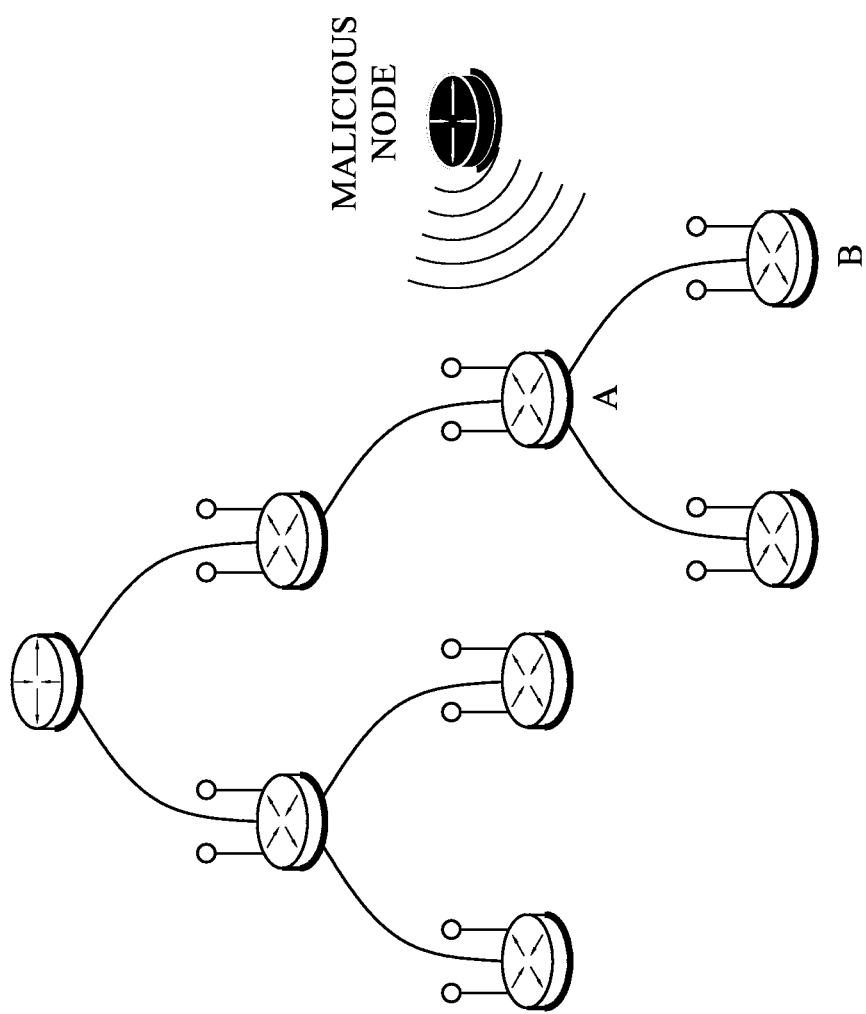
FIGS. 4A-5H illustrate an example of quarantine-based mitigation of effects of a local DoS attack.
Figure 4B:
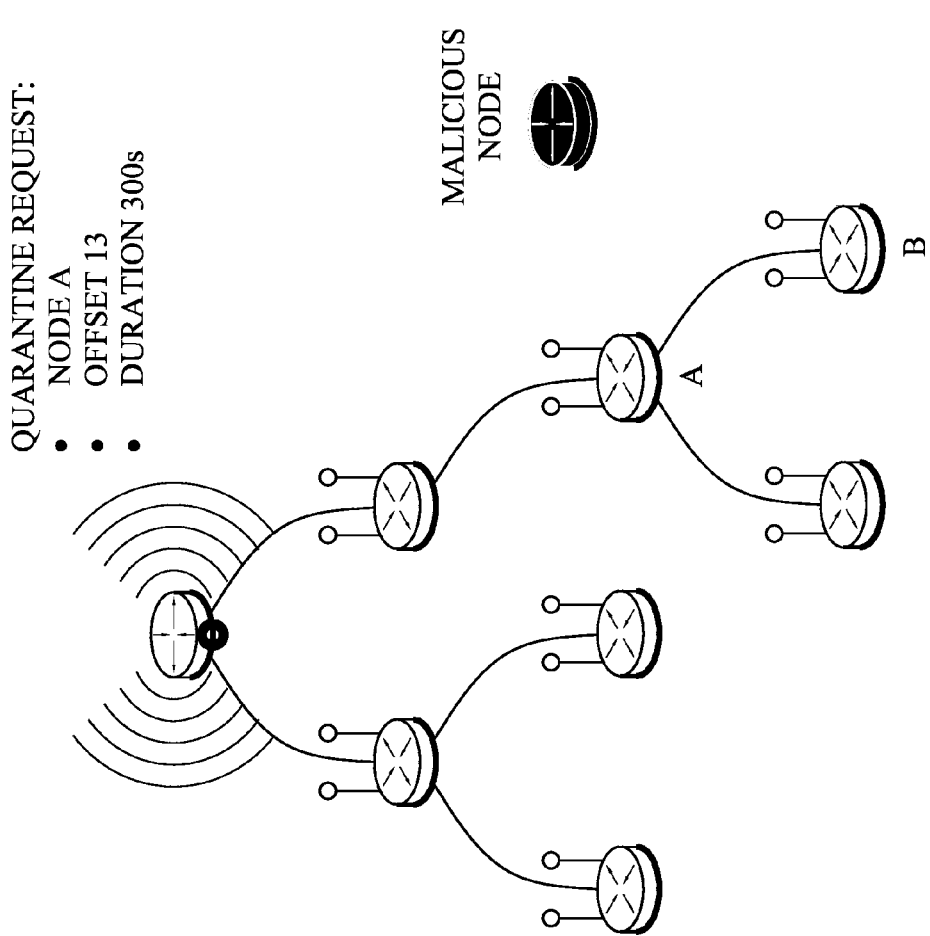
Figure 4C:
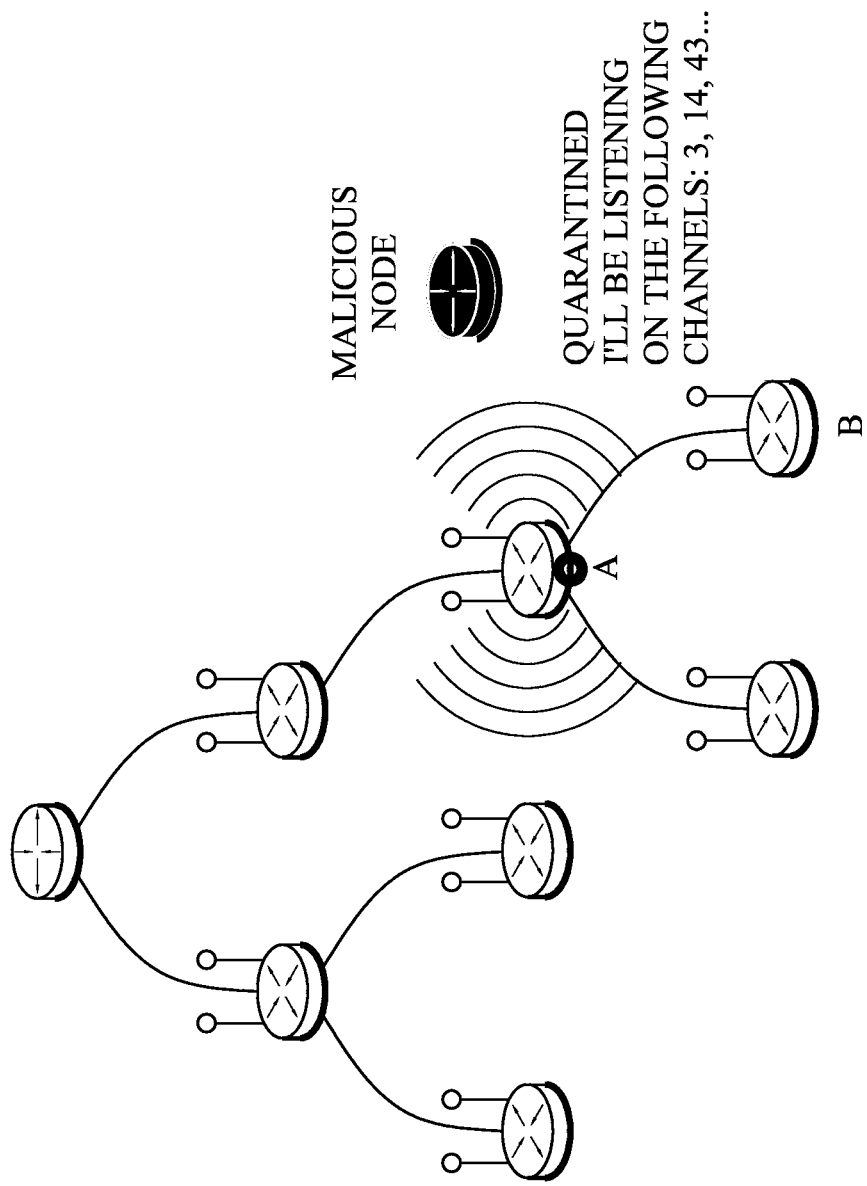
Figure 4D:
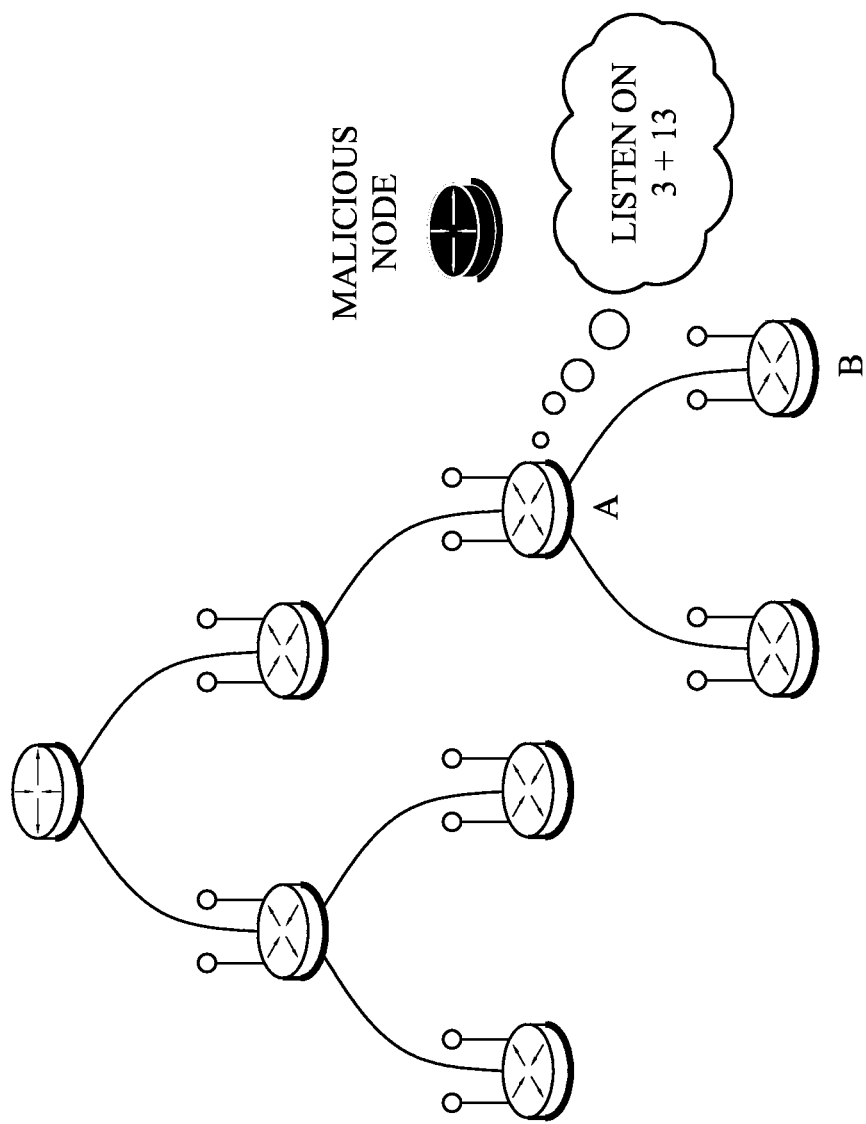
Figure 4E:
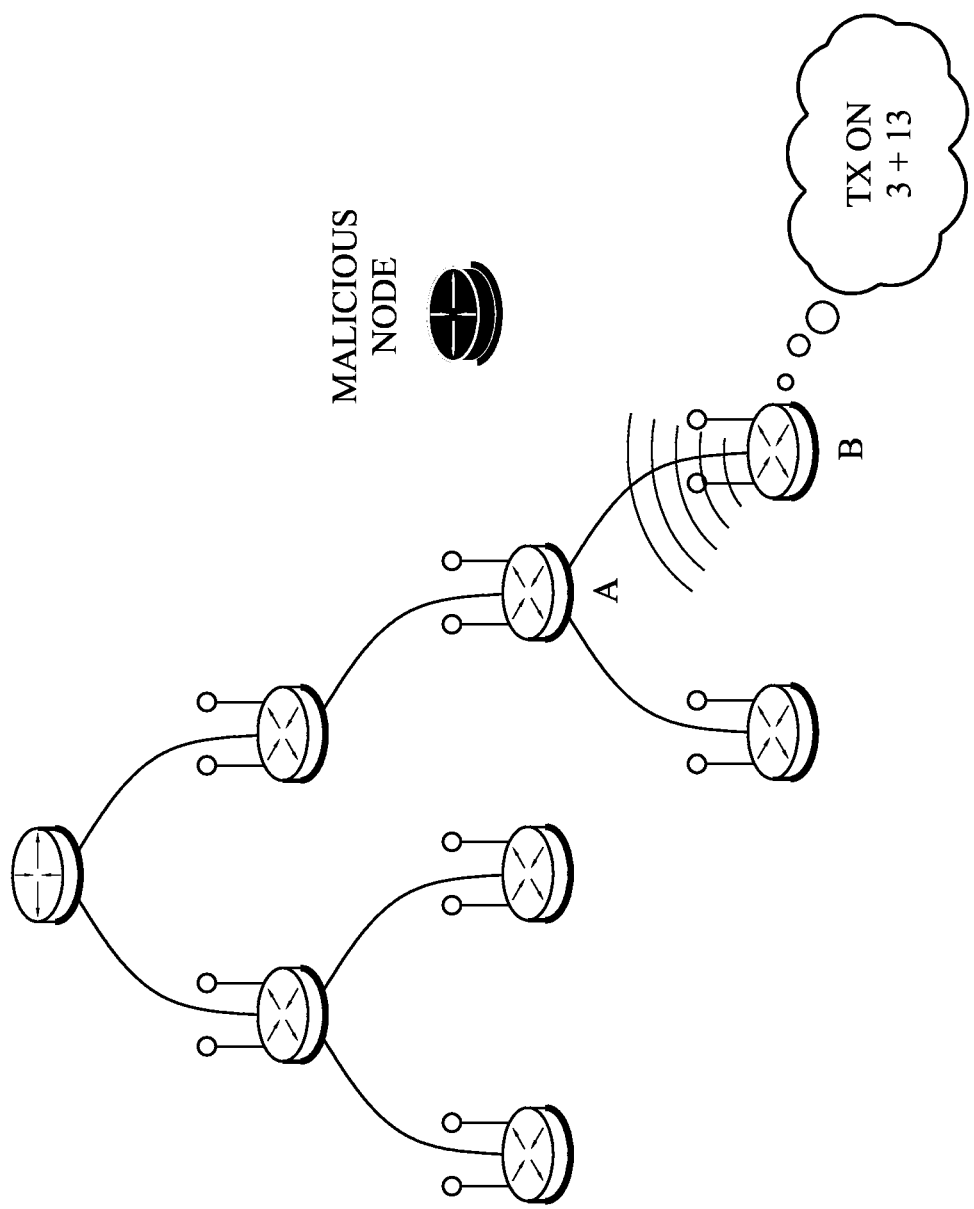
Figure 5A:
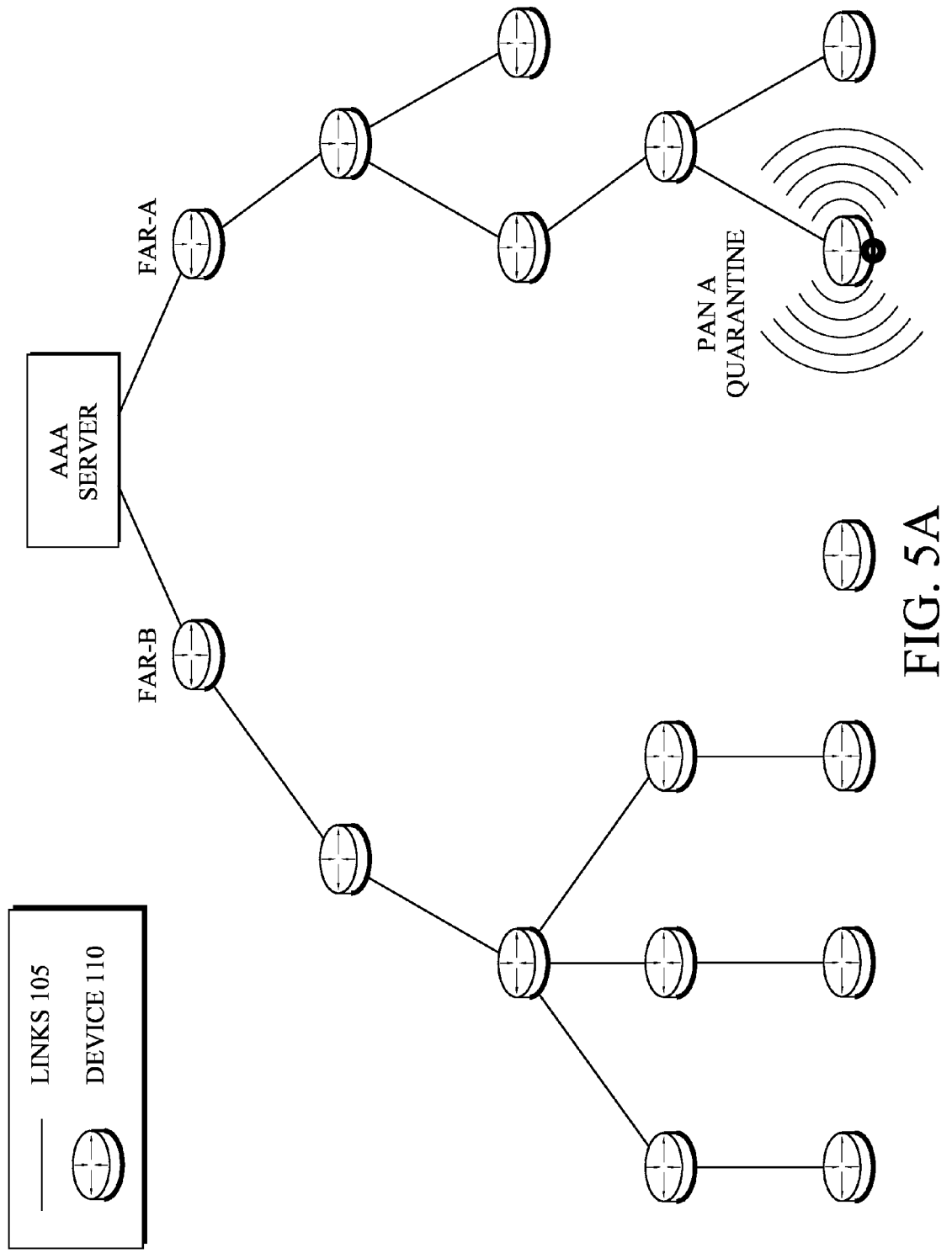
Figure 5B:
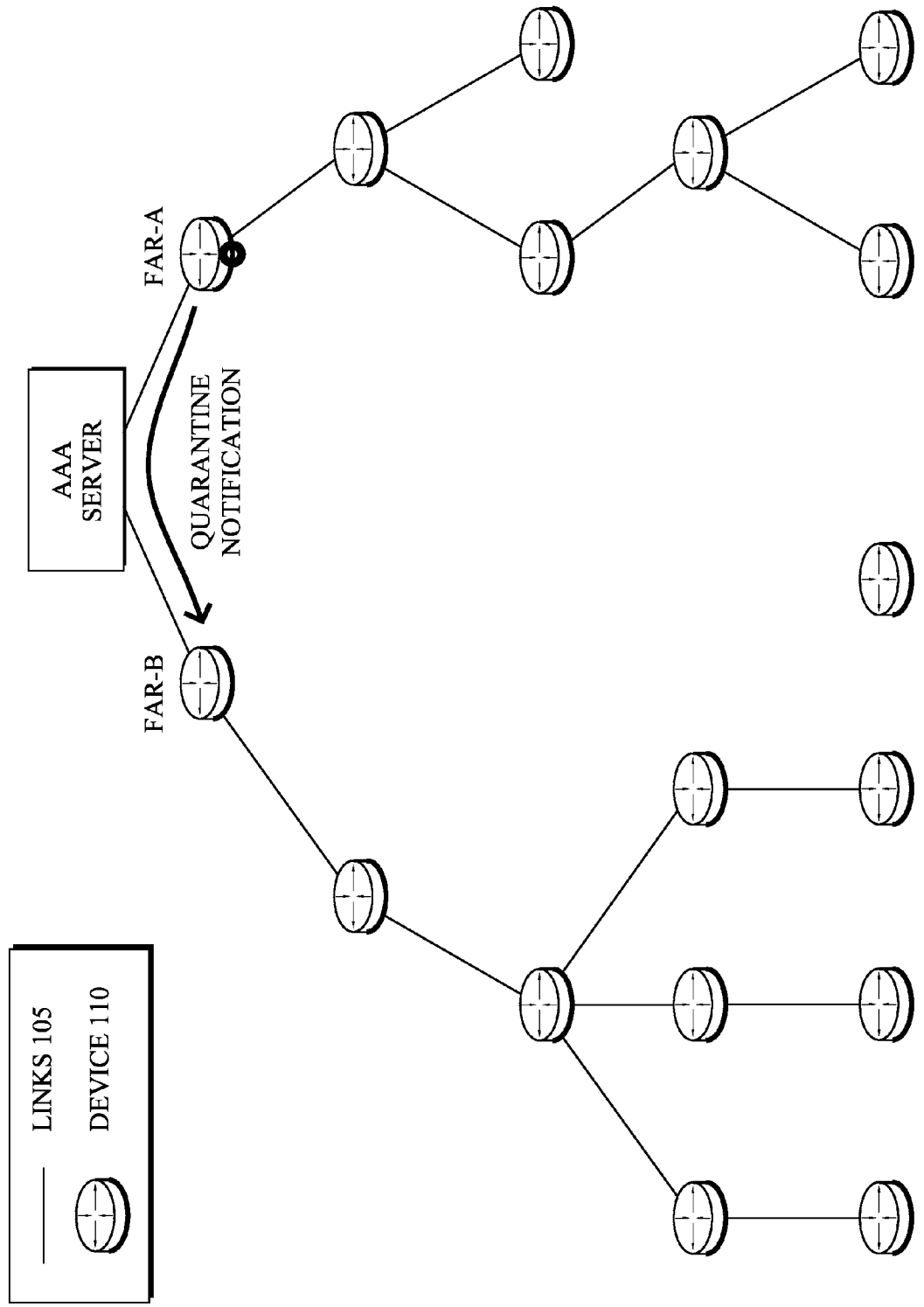
Figure 5C:
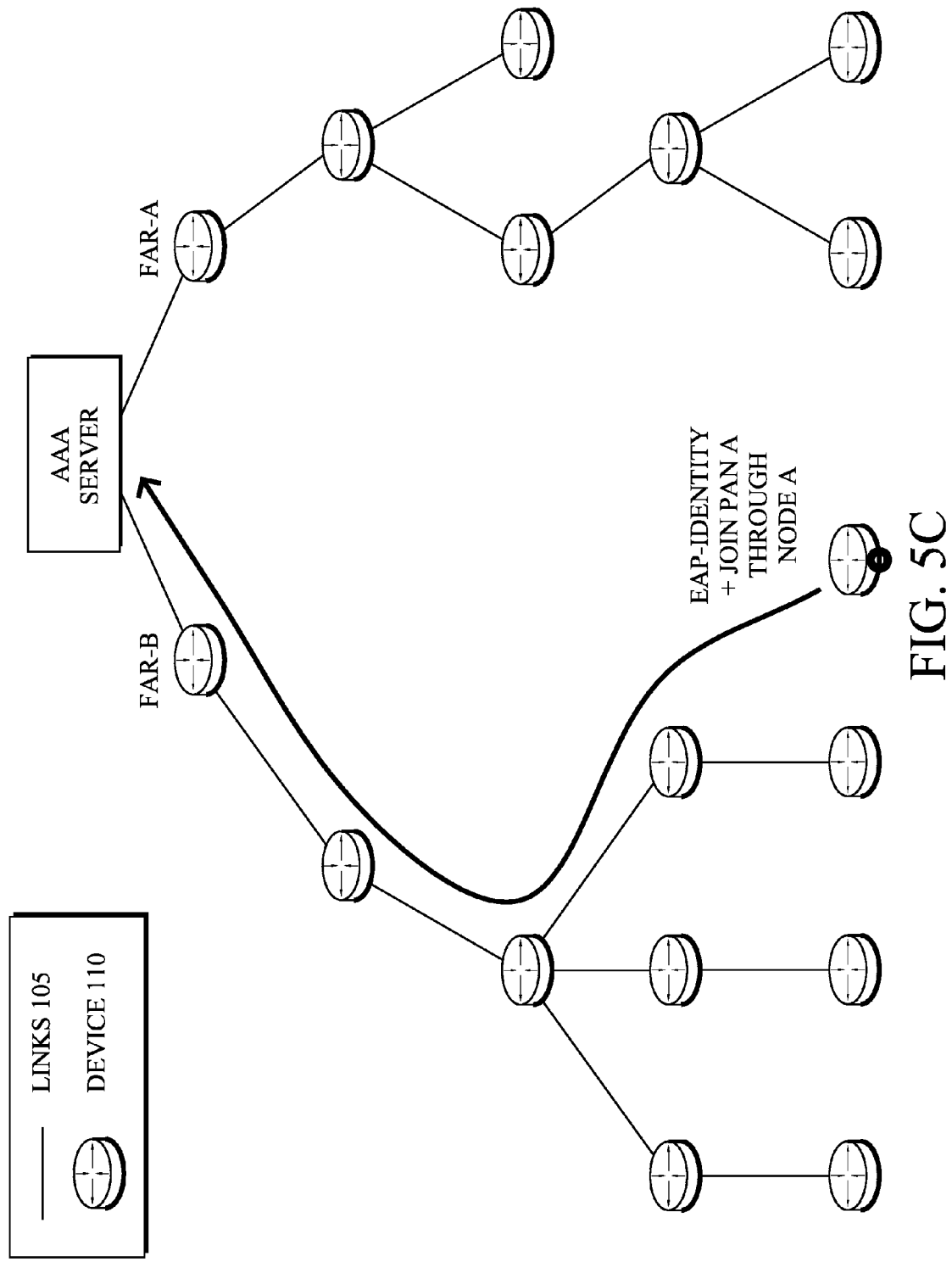
Figure 5D:
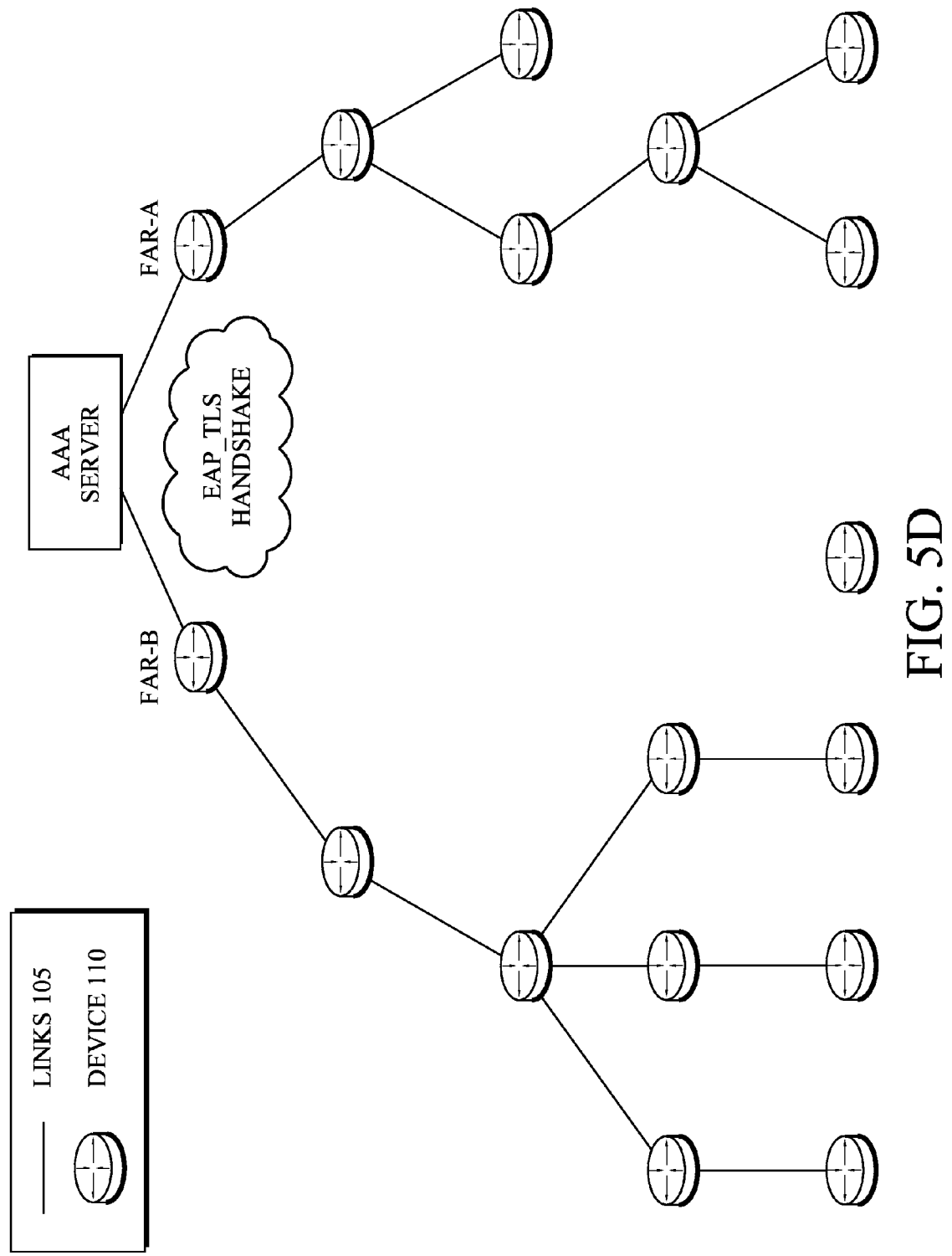
Figure 5E:
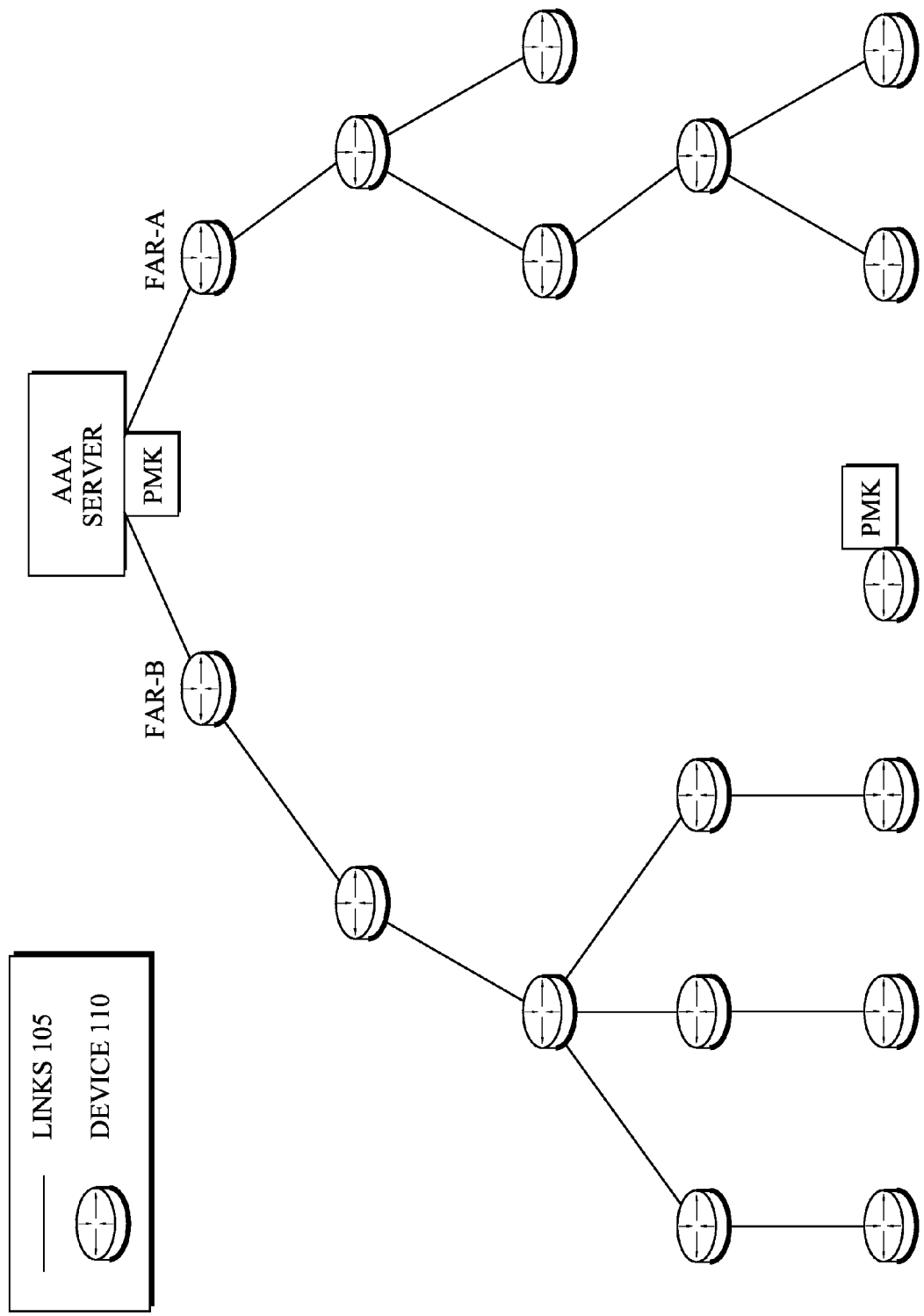
Figure 5F:
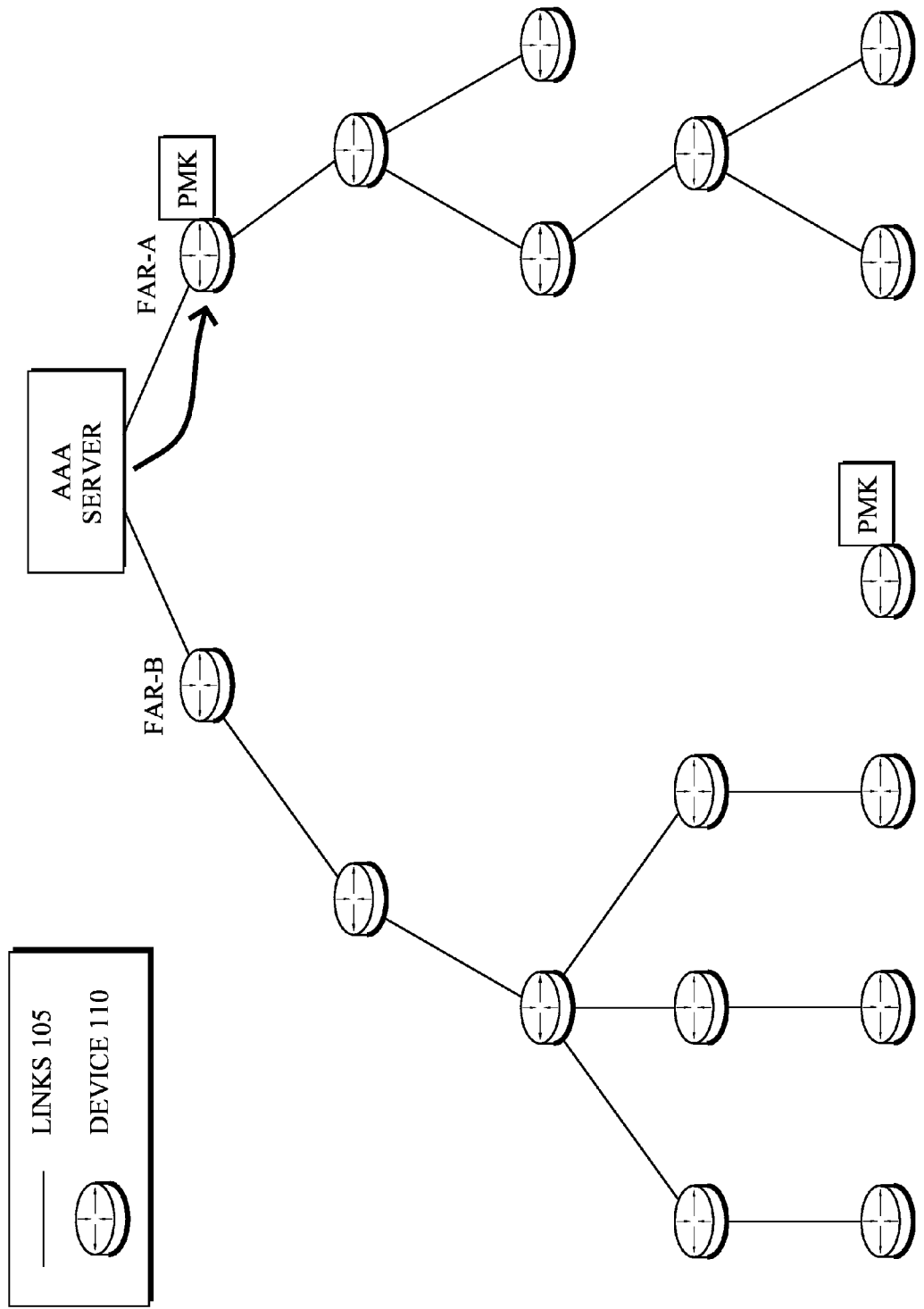
Figure 5G:
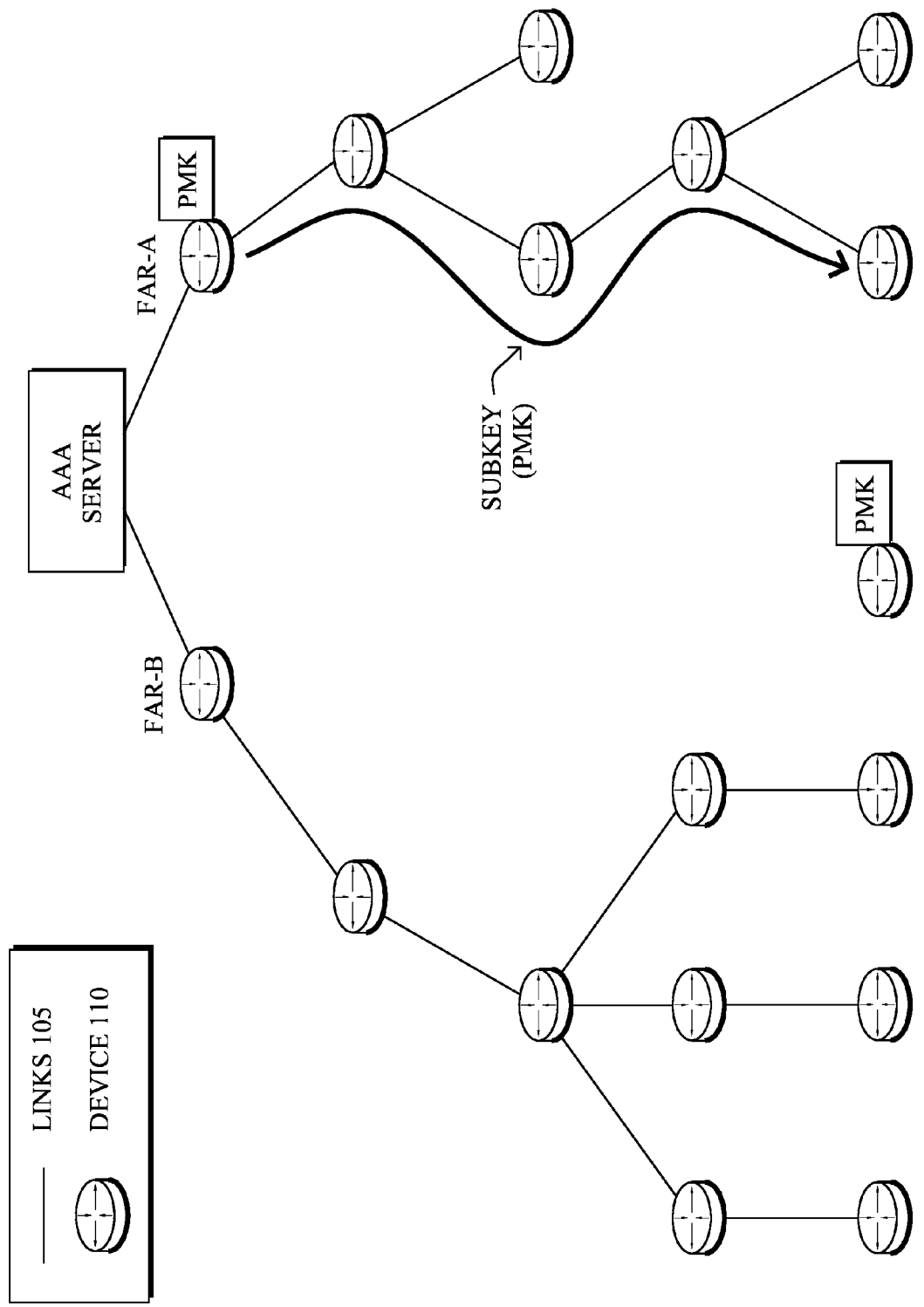
Figure 5H:
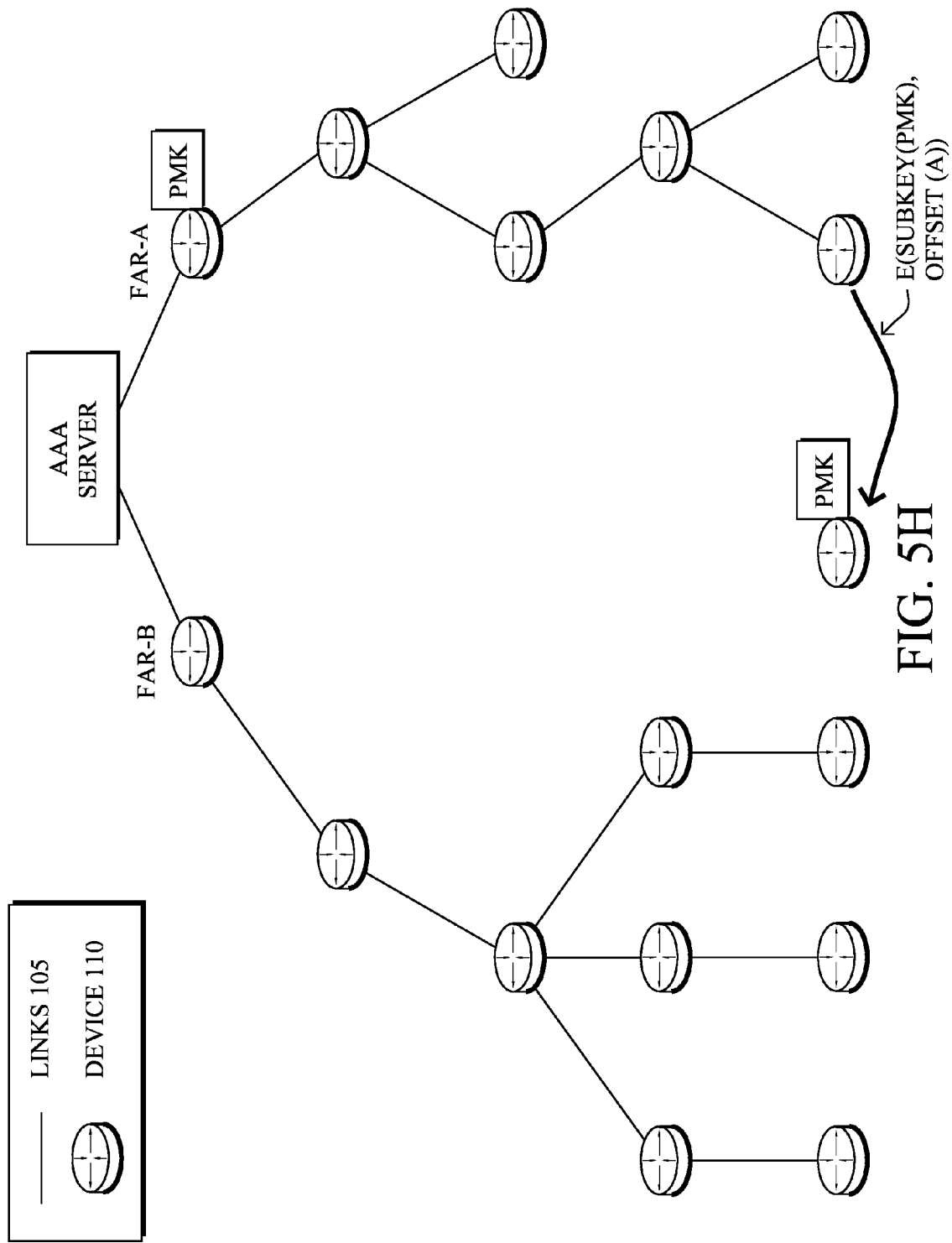

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data.

The interesting aspect of ANNs, though, is not that they can produce highly non-linear outputs of the input, the interesting aspect is that they can learn to reproduce a predefined behavior through a training process. This capacity of learning has allow the successful application of ANNs to a wide variety of learning problems, such as medical diagnosis, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass through the ANN. With this gradient, the weights of the ANN that minimize the cost function can be computed.

Denial of service (DoS) is a broad term for any kind of attack aiming, by any means, at making a particular service unavailable (be it a certain application running on a server or network connectivity itself). This is usually performed by bringing the target's resources to exhaustion (again, target resources may range from bandwidth to memory and CPU).

In greater detail, a denial-of-service attack may consist in flooding a target network with hundreds of megabits of traffic (volume based DoS), exhausting a server state by opening a number of TCP connections (SYN flooding) or by making an HTTP server unavailable by sending it an overwhelming number of requests. An attack may be subtler and exploit well-known vulnerabilities in the target system (e.g. a large number of fragmented IP packets may exhaust the resources of a router).

Nowadays, denials of service attacks are mostly distributed: they are indeed carried out by multiple sources at the same time, thus making it more difficult to track. In many cases botnets (i.e. armies or infected hosts spread across the network and under the control of a single master) are used for mounting DoS attacks. In addition, source addresses used for attacks can be spoofed, so that blocking an offending address is potentially useless.

A large literature exists about detection and mitigation of DoS attacks. Such attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things represents a completely different scenario and requires novel detection and reaction strategies. Its highly distributed nature implies that there is no central vantage point where an attack can be observed. In addition, its very scarce resources force reporting from the nodes to a central location to be reduced to a minimum.

On top of the lack of global information, detecting DoS in the IoT is made harder by the fact that a much subtler interference may be enough for bringing the network down.

For example, a jamming node can prevent a node from decoding traffic by just emitting short bursts when activity on the channel is detected. This can isolate a large portion of the network which uses that node as a parent and cut off a large portion of the network.

In addition, in case of battery operated nodes, a slow but steady flow of malicious traffic can exhaust a node's battery, thus making it useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data are typical of a known anomalous behavior —Possible Attacks Against IoT—

Even though the existing literature about attacks against the IoT is relatively reduced, a number of attacks against sensor network technologies apply with a few minor modifications.

Such attacks can be roughly classified into two classes: insider attacks (where the malicious node needs to be authenticated and be in possession of the network encryption keys) and outsider attacks (where the attacker just needs to be within the radio range of the victims).

In particular, a number of attacks against routing performed by a malicious node in the DAG can be imagined.

A node can, for example, perform selective forwarding: while still participating correctly to the routing protocol, it can just discard some of the traffic messages that it is asked to forward. Although this can be revealed by end-to-end mechanisms, due to the low traffic rate and lossiness of the IoT networks detection of the issue can be difficult and slow.

Other attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming) or attack only a particular type of traffic (selective jamming). The damage from a jamming attack can be maximized if the attacker is able to estimate the centrality of a node in the routing topology (this can be obtained by accounting the amount of traffic transmitted and received by each node, by leveraging the fact that the link layer addresses are in clear). Once the jammer has detected the most central node, it can try to make it unreachable for its descendants, which will in turn be forced to select another parent. This can potentially create continuous route oscillations and convergences.

Other kinds of external denial-of-services attacks can be performed by exploiting the fact that a number of messages in the WPAN do not need authentication: among those are discovery beacons and some of the EAPoL messages for authentication.

In particular, discovery beacons can be used for injecting bogus synchronization information in the network, so as to prevent two nodes from meeting on the right unicast communication frequency.

EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may be for authentication requests can be rate-limited. However this may result in legitimate nodes being prevented from authenticating when an attack is in progress.

Other attacks can be performed against the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), firmware download to upgrade (e.g. to upgrade AMI meter software to a newer version), and power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent to a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

Notably, once a DoS attack is detected, it becomes required to activate some form of control loop to mitigate the issue. In its simple form, this may consist in sending an alarm to the user in the form of a network management message or via the NMS. In addition, in many circumstances it is required to activate some close loop control from the edge of the network in order to quickly mitigate/isolate, if not remediate, the issue. Moreover, the open nature of the physical medium and the fact that unicast frequency scheduling of the nodes is broadcasted in clear using the IEEE 802.15.4 link layer make it extremely difficult to make the attacker powerless. Even if routing can be reconfigured in order to isolate the attacked nodes, it is difficult to prevent an attacker from changing its target. In fact, the attacker can leverage the network reaction in order to make routing unstable. The only safe countermeasure may be completely isolating the physical range of the attacker, but this may have a huge impact on the network functionality (in fact, this may even make a portion of the network unreachable).

Quarantine-Based Mitigation of Effects of a Local DoS Attack

This techniques herein specify a set of mechanisms for mitigating the effects of a DoS attack against a PAN. In particular, once an attack is detected, the involved nodes (or nodes residing in the vicinity of the nodes under attack) are instructed to change their frequency scheduling based on a secret included in a proper broadcast message (since the scheduling of the broadcast slot is not available to non-authenticated nodes, even the attacked nodes will receive such message). Therefore the unicast frequency scheduling will become unpredictable for non-authenticated nodes. The mitigation may make use of dynamically computed periods of quarantine, according to the number of nodes detected under attack and their respective probabilities of attack. In addition, historical data may be used by the quarantine algorithm to decide which of the nodes to quarantine. Because the quarantine mechanism will prevent new nodes from joining the mesh under attack through the quarantined nodes, the techniques herein also provide a mechanism for using another PAN to perform the first part of the node authentication. In particular, the node will use an alternate PAN to negotiate a shared secret with the FAR, which, in turn, will use such secret to safely communicate to the node with obscured frequency scheduling. From that point on, the joining node will carry on the last steps of the authentication procedure as in the normal attack-free case.

An assumption of this technique is that the set of nodes that are being attacked can be discovered through an external mechanism. Such mechanism can be either completely distributed or may involve both distributed and centralized mechanisms.

Operationally, as shown in (and with general reference to) FIGS. 4A-5H, once the involved nodes have been detected, the FAR (or, in general, the entity performing detection) will broadcast a newly specified quarantine request message (e.g., a quarantine request packet). Such a quarantine request message may include the following information:

Duration of the quarantine period; and

List of the nodes to be quarantined. For each of those nodes a secret will be included which will be used to modify its frequency hopping scheduling. In the case of an example implementation, this may involve adding a random offset to the current slot ID. In this case, the secret may be used by a cryptographic hash function, which would be used to map the current (public) channel ID into channel number, which would be unpredictable by the attacker.

The newly defined quarantine message may either be unicast, multicast or broadcast to all nodes (in which case it would include the list of (compressed) addresses of the nodes under quarantine).

Upon reception of such a quarantine request message, each of the quarantined nodes will change its unicast schedule according to the directions included in the quarantine request message. As for the nodes not directly involved in the quarantine process, they will store the new synchronization information included in the message. This may allow them to keep following the unicast schedule of the quarantined nodes. Notice that, the quarantine request message, being a broadcast message, will be transmitted during the broadcast slot and, therefore, will be able to reach the attacked nodes.

The quarantined nodes will keep emitting their discovery beacons, which will include a quarantine flag. Such beacons will still contain synchronization information: nodes that are authenticated to the network and received the secret associated to the sending node will be able to use such information for fine-tune synchronization with the sending node. Nodes joining the PAN, on the other hand, will be notified by the quarantine bit that the included synchronization information is not sufficient for synchronizing with the sending node, and consequently new nodes in the network will not be able to join quarantined nodes, which is a desirable effect.

An extremely simple example of this mechanism is explained in FIGS. 4A-4E. Assume that node A is under attack, which is detected by the FAR. The FAR will broadcast a quarantine request message, specifying that node A is under attack and it needs to change its frequency schedule by adding offset 13 (this is of course oversimplified, as this code would be easy to break by the attacker); also, the message specifies the duration of the quarantine state. Upon reception of such a message, node A will shift its frequency hopping schedule, but keep sending its discovery beacon specifying its public frequency schedule and indicating that the node is in quarantine state. If node B needs to transmit unicast data to node A, it will use the latest synchronization information received from node A and modify it by using the appropriate secret information received through the quarantine request message (in this exemplary case, this will simply involve adding offset 13 to the nominal frequency).

After this step, unicast network activity can resume as usual, as the attacker will not be able to synchronize with its targets on the right frequency. However, any nodes not yet authenticated with the WPAN will not be able to join the PAN. This may be exactly what the attacker is trying to do. In this case, the network may need to allow the node to join through another WPAN. To this end, the joining node will not join a WPAN through a node that is advertising its quarantine state.

—Dynamic Quarantine Period of Time and Nodes in Quarantine State—

In yet another embodiment, the FAR may use a dynamic quarantine period T, using an exponential backoff. For example, T may first be set to T_Min, then 2*T_Min should new attacks be detected, then 4*T_Min until T_Max. The quarantine period may also be a function of the number of DoS attacks and nodes in quarantine states. For example, if the number of nodes detected as being under attack decreases, the FAR may decide to reduce the quarantine period. Conversely, if that number increases, the FAR may increase the quarantine period.

Another component relates to the selection of nodes selected for quarantine. In one embodiment, the FAR may put a node in quarantine state if the probability of attack of such a node is higher than a pre-configured probability p. In another embodiment, the FAR may decide to quarantine an entire area, as a safe guard measure. For example, if the FAR determines that three of five nodes in close proximity are under attack and that these nodes have been attacked in sequence or simultaneously, it may decide to put all five nodes in quarantine.

In yet another embodiment the FAR may take into account historical data related to nodes that previously joined a node that is subject to be in quarantine. If for example, the FAR determines that a node N is subject to be selected by a high number of new joining nodes and the probability of attack is not that high, it may rather not put the node N on quarantine. If the node is a leaf node that never had any children in the past, it may decide to put the node in quarantine.

Note that all combinations of the above are possible. The FAR may use static/dynamic quarantine periods, selective versus inclusive (adding more nodes than just the nodes under attacks) strategy, make use of historical data and/or probability of attack into account in order to decide of the most appropriate quarantine approach. Indeed, machine learning techniques, such as random forests, can be applied here for developing a completely autonomous decision making system that applies one or more of these modes of operation according to the current conditions of the system.

Another component of the techniques herein relates to the propagation of the information indicating that a PAN (or at least several nodes of a PAN are under quarantine). To that end, a FAR responsible for the PAN under attack will notify the FARs associated to the neighboring PANs of the quarantine state, thanks to a newly defined unicast IPv6 messages (e.g., a quarantine state message) sent to other FARs that have PANs potentially overlapping with the PAN under (partial) quarantine, along with the quarantine period. Note that alternatively such a quarantine state message may be sent to the NMS that will appropriately redirect the "quarantine" states information to other FARs.

In one embodiment of the techniques herein, the notified FARs will make sure that their associated PANs are accepting new nodes. Indeed, in currently deployed networks, IEEE 802.15.4 IE (Information Element) are used by a FAR to provide some indication related to their current load. Such an indication is then used by joining nodes in the network to select a PAN, should they see a set of PAN in their vicinity. Upon receiving a notification from another FAR that it's PAN is under quarantine, the FAR may adapt such parameters to encourage new nodes to join their PAN. However, this may lead to suboptimal PAN association (the PAN under attack may provide a much better connectivity and may be much less loaded).

In another embodiment of this invention, the joining node can join an alternate PAN and use this network for authenticating with the PAN under attack. Once the joining node is authenticated with the PAN under attack, it will start receiving its encrypted synchronization information. The nodes of the PAN under attack will still be emitting their broadcast beacons: therefore, the joining node will be able to determine that the PAN under attack is its best association choice.

As an example, assume that node N decides to join PAN-A (managed by FAR-A), which is under attack, and that N is in the physical range of PAN-B (managed by FAR-B), which is not under attack. In this case, node N will elect a provisional proxy node in PAN-B and will initiate the EAPOL based procedure for authentication. Node N will add a specific EAPOL extension specifying that it is using PAN B as a provisional PAN for eventually joining PAN-A; such message will also include N's elected proxy node in PAN-A.

Assuming that the AAA infrastructure handling the two PANs is the same, node N will be able to perform the authentication handshake with such a server by using the standard procedure and to negotiate a shared secret with the network security infrastructure. Such a secret (called PMK) will be sent by the AAA to FAR-B. In this case, FAR-B, instead of using such secret for transferring its network key to the node, will transfer such PMK to FAR-A, along with the address of the elected proxy node in PAN-A.

The target FAR, in turn, will use the received PMK for creating a proper sub-key (this will be based on an algorithm that node N will be aware of). Subsequently, FAR-A will send to the elected proxy node a unicast message containing:
  the generated sub-key;
  the mac address of node N.

The elected proxy, upon reception of such message, will send to node N a unicast message containing its unicast frequency scheduling secret after encrypting it by using the received sub-key. By using such information, the node will be able to perform unicast communication towards its proxy node (while the attacker will still be unaware of the proxy's frequency scheduling). From this point on, N will continue with its regular authentication procedure with FAR-A (in one example specific implementation, this will imply a secure handshake using the 802.11i protocol).

FIGS. 5A-5H show an example of such procedure: node N decides that PAN-A is the most suitable pan for joining, but it receives from node A a discovery beacon with the quarantine flag set. Node N decides then to use PAN-B for the first phase of its authentication. In particular, it specifies in its first EAPOL message that it wants to eventually join PAN-A and its proxy node will be A. Subsequently, node N will use PAN-B to perform its handshake with the AAA server. This handshake will result in both node N and the AAA server sharing a secret PMK. As usual, the AAA server will transmit PMK to the authenticating FAR (FAR-B). FAR-B, instead of using this secret for communicating its network key to N, will forward it to FAR-A. FAR-A, in turn, will create a one-time sub-key based on PMK and send it to proxy node A. A, in turn, will encrypt its secret unicast frequency offset by using the received sub-key and send it to N. From now on, N will be able to communicate by using A as its proxy for PAN-A and it will conclude its authentication with FAR-A.

The techniques described herein, therefore, provide for quarantine-based mitigation of effects of a local DoS attack. In particular, the techniques herein allow protecting a network from DoS attacks by encrypting its unicast frequency hopping schedule. Moreover, the techniques herein allow nodes to keep joining the PAN under attack by using another PAN for performing the first steps of the authentication procedure as described above.

Figure 6:
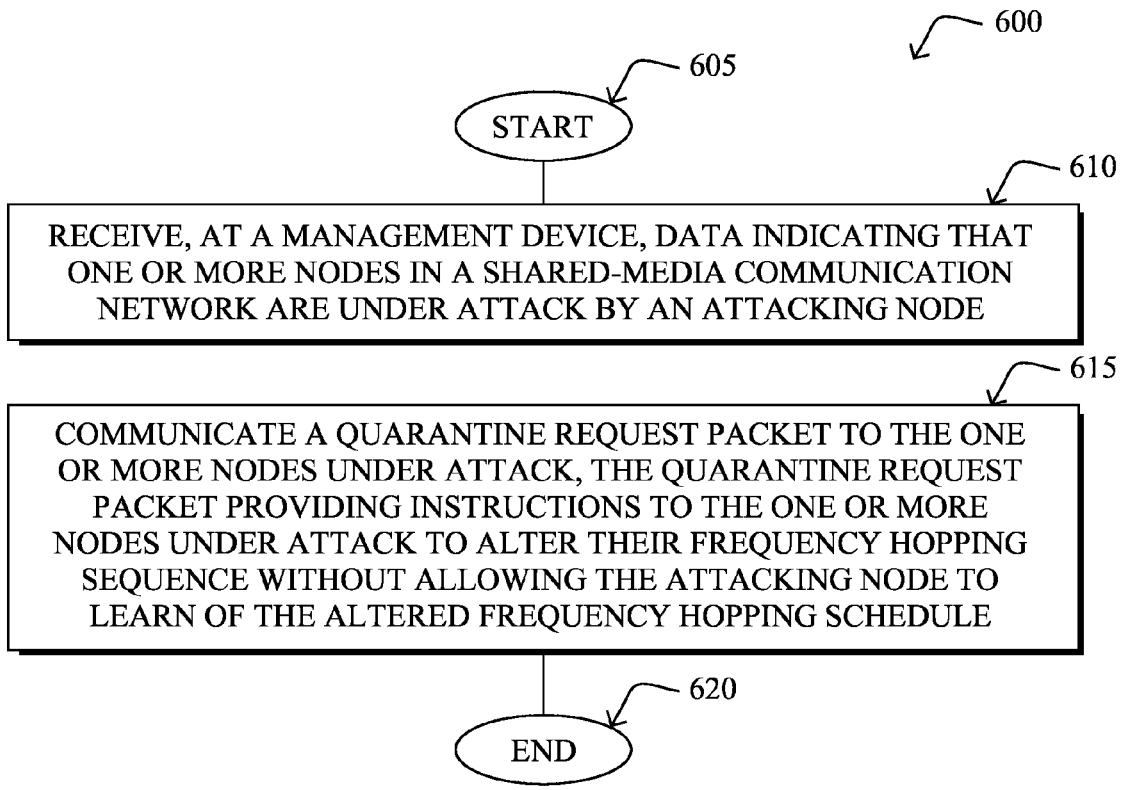
FIG. 6 illustrates an example simplified procedure for quarantine-based mitigation of effects of a local DoS attack, particularly from the perspective of a management device.

FIG. 6 illustrates an example simplified procedure 600 for quarantine-based mitigation of effects of a local DoS attack, particularly from the perspective of a management device. The procedure 600 may start at step 605, and continue to step 610 where, as described above, a management device may receive data indicating that one or more nodes in a shared-media communication network are under attack by an attacking node. As shown in step 615, the management device may then communicate a quarantine request packet to the one or more nodes under attack, the quarantine request packet providing instructions to the one or more nodes under attack to alter their frequency hopping schedule without allowing the attacking node to learn of the altered frequency hopping schedule. As described above, this has the advantage that the altered frequency hopping schedules are encrypted. Illustratively, the simplified procedure may end at step 620.

Figure 7:
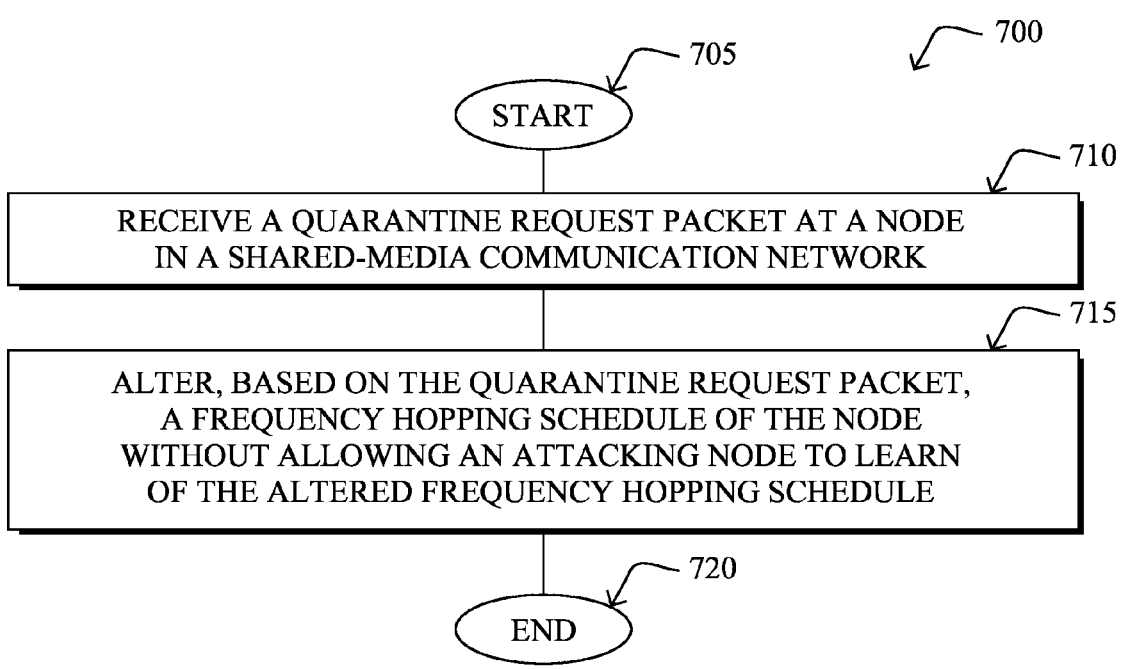
FIG. 7 illustrates an example simplified procedure for quarantine-based mitigation of effects of a local DoS attack, particularly from the perspective of a node in a shared-media network.

Similarly, FIG. 7 illustrates an example simplified procedure 700 for quarantine-based mitigation of effects of a local DoS attack, particularly from the perspective of a node in a shared-media network. The procedure 600 may start at step 605, and continue to step 610 where, as described above, a node in a shared-media network may receive a quarantine request packet. The node may then alter, based on the quarantine request packet, a frequency hopping schedule of the node without allowing an attacking node to learn of the altered frequency hopping schedule, as shown in step 715. Illustratively, the simplified procedure may end at step 720.

It should be noted that while certain steps within procedures 600 and 700 may be optional as described above, the steps shown in FIGS. 6 and 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network attack mitigation, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a management device, data indicating that one or more nodes in a shared-media communication network are under attack by an attacking node; and
    communicating a quarantine request packet to the one or more nodes under attack, the quarantine request packet providing instructions to the one or more nodes under attack to alter their frequency hopping schedule without allowing the attacking node to learn of the altered frequency hopping schedule by encrypting the frequency hopping schedule.

2. The method as in claim 1, wherein the quarantine request packet includes a secret key that determines the altered frequency hopping schedule.

3. The method as in claim 1, wherein the quarantine request packet includes a list of the one or more nodes under attack to be quarantined.

4. The method as in claim 1, wherein the quarantine request packet determines the duration for which the one or more nodes under attack will be quarantined.

5. The method as in claim 1, wherein the quarantine request packet is unicast or multicast to the one or more nodes under attack.

6. The method as in claim 1, wherein the quarantine request packet is broadcast to the one or more nodes under attack.

7. The method as in claim 6, wherein the quarantine request packet includes a compressed list of the one or more nodes under attack to be quarantined.

8. The method as in claim 1, further comprising:
    communicating a quarantine state message to one or more shared-media networks to ensure the one or more shared-media networks are accepting new nodes.

9. A method, comprising:
    receiving a quarantine request packet at a node in a shared-media communication network;
    altering, based on the quarantine request packet, a frequency hopping schedule of the node without allowing an attacking node to learn of the altered frequency hopping schedule by encrypting the frequency hopping schedule.

10. The method as in claim 9, further comprising:
    communicating a discovery beacon to indicate a public frequency schedule.

11. The method as in claim 10, wherein the discovery beacon includes a quarantine flag.

12. The method as in claim 10, wherein the discovery beacon includes an indication that the communicating node is in quarantine.

13. The method as in claim 9, wherein the quarantine request packet includes a duration period for quarantine.

14. The method as in claim 13, wherein the duration period for quarantine is dynamically adjusted.

15. An apparatus, comprising:
    one or more network interfaces to communicate within a computer network;
    a processor coupled to the network interfaces and configured to execute one or more processes; and
    a memory configured to store a process executable by the processor, the process when executed operable to:
        receive, at a management device, data indicating that one or more nodes in a shared-media communication network are under attack by an attacking node; and
        communicate a quarantine request packet to the one or more nodes under attack, the quarantine request packet providing instructions to the one or more nodes under attack to alter their frequency hopping schedule without allowing the attacking node to learn of the altered frequency hopping schedule by encrypting the frequency hopping schedule.

16. The apparatus as in claim 15, wherein the quarantine request packet includes a secret key that determines the altered frequency hopping schedule.

17. The apparatus as in claim 15, wherein the quarantine request packet includes a list of the one or more nodes under attack to be quarantined.

18. The apparatus as in claim 15, wherein the quarantine request packet determines the duration for which the one or more nodes under attack will be quarantined.

19. The apparatus as in claim 15, wherein the quarantine request packet is unicast or multicast to the one or more nodes under attack.

20. The apparatus as in claim 15, wherein the quarantine request packet includes a compressed list of the one or more nodes under attack to be quarantined.

\* \* \* \* \*